United States Patent [19]

Yoshii et al.

[11] Patent Number: 4,563,265

[45] Date of Patent: Jan. 7, 1986

[54] USE OF A CATALYST IN A HYDROGENOLYSIS PROCESS

[75] Inventors: Tsuneo Yoshii, Nara; Toshitaka Ueda, 5-23, Yagi-cho 3-chome, Kashihara-shi, Nara-ken, both of Japan

[73] Assignee: Toshitaka Ueda, Nara, Japan

[21] Appl. No.: 620,049

[22] Filed: Jun. 12, 1984

Related U.S. Application Data

[62] Division of Ser. No. 500,914, Jun. 3, 1983, Pat. No. 4,467,049.

[30] Foreign Application Priority Data

Feb. 2, 1983 [JP] Japan ................................. 58-16522

[51] Int. Cl.[4] ..................... C10G 47/02; C10G 19/067
[52] U.S. Cl. .................................... 208/108; 208/112
[58] Field of Search ................................. 208/108, 112

[56] References Cited

U.S. PATENT DOCUMENTS 3,211,669 10/1965 Unverforth ........................ 208/112
3,816,298 6/1974 Aldridge ............................ 208/108

Primary Examiner—D. E. Gantz
Assistant Examiner—Chung K. Pak
Attorney, Agent, or Firm—Wenderoth, Lind & Ponack

[57] ABSTRACT

A catalyst used for liquefaction of coal and hydrogenolysis or hydrodesulfurization of heavy oils. The catalyst is prepared by reacting one or more compounds selected from the group consisting of carbonyl compounds of molybdenum, salts of molybdenum, oxides of molybdenum, metallic molybdenum, and alloys containing molybdenum, with alkali and water at a temperature ranging from 220° to 450° C. under a carbon monoxide atmosphere; and reducing the product obtained at temperature ranging from 400° to 450° C. under a hydrogen atmosphere.

9 Claims, 7 Drawing Figures

USE OF A CATALYST IN A HYDROGENOLYSIS PROCESS

This application is a division of Ser. No. 500,914, filed June 3, 1983 now U.S. Pat. No. 4,467,049.

BACKGROUND OF THE INVENTION

1. Field of the Invention

The present invention relates to a catalyst used for liquefaction of coal and hydrogenolysis or hydrodesulfurization of heavy oils.

2. Description of the Prior Art

Conventionally, as catalysts for hydrogenolysis or hydrodesulfurization of heavy oils, oxides of Co-Mo, Mo-Ni or Ni-W compounds have been used together with carriers such as alumina and silica. These catalysts, when used in residual oil of heavy oil or in asphalt, have an extremely lowered catalytic activity, and are permanently poisoned, and it is almost impossible to regenerate them.

The object of the present invention is to solve this problem and to provide a catalyst which is high in activity, easy to regenerate, and suited particularly to hydrogenolysis or hydrodesulfurization of heavy petroleum oils.

SUMMARY OF THE INVENTION

The catalyst conforming to the present invention is produced by causing or one or more compounds selected from the group consisting of (a) carbonyl compounds of molybdenum, (b) salts of molybdenum, (c) oxides of molybdenum, (d) metallic molybdenum, and (e) alloys containing molybdenum to react with alkali and water at temperature ranging from 220° to 450° C. in a carbon monoxide atmosphere, and reducing the product from this reaction at a temperature ranging from 400° to 450° C., together with a phenol, in a hydrogen atmosphere.

According to the present invention, it is possible to obtain a catalyst which has a high activity, is easy to regenerate, and is suited particularly to liquefaction of coal and hydrogenolysis or hydrodesulfurization of heavy petroleum oils.

Figure 1:
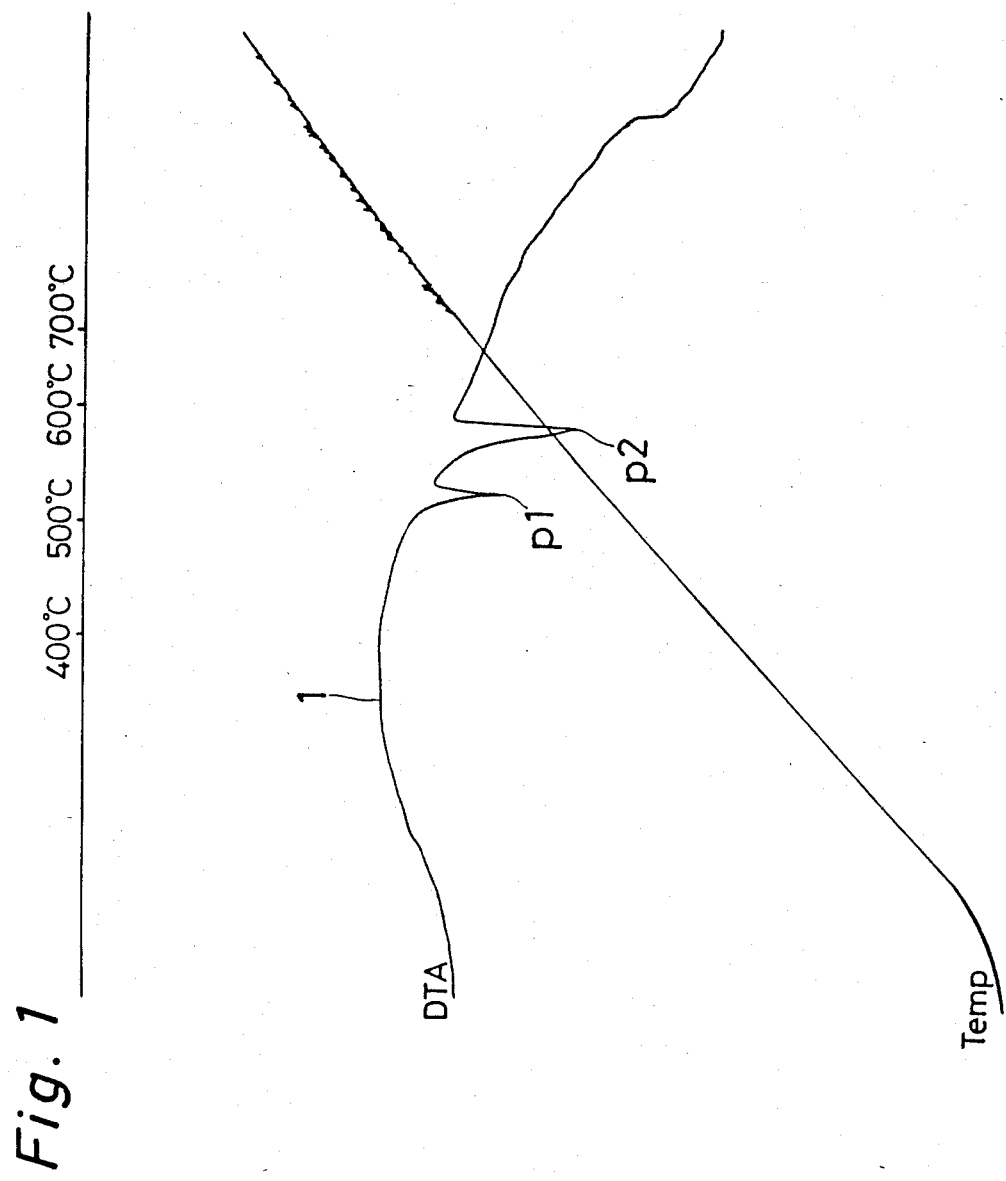
FIGS. 1 and 2 are charts of differential thermal analysis.

In the drawings P1 to P12 refer to peaks.

As the carbonyl compound of molybdenum (a), molybdenum carbonyl is appropriate. As the salts of molybdenum (b), for example, any one of ammonium salt, nitrate, chloride, carbonate and organic acid salt may be used, of which ammonium salt is most preferable. As the oxide of molybdenum (c), a trioxide may be preferably employed. As the alloy containing molybdenum (e), for example, SCM, SKH, SUS containing molybdenum by at least 0.3 weight percent may be used. A catalyst formed on an alloy is excellent in mechanical strength and is easy to regenerate. As the alkali, a carbonate or phosphate of an alkali metal, for example, sodium carbonate or, sodium phosphate, or any other similar substance may be used provided it is expressed by a general formula of MOH. In this expression, M refers to an alkalin metal or ammonium group, and also to an alkaline earth metal such as calcium or barium.

To introduce a carrier into the catalyst conforming to this invention, the carrier may be mixed with the catalyst components before adding the alkali and water in the manufacturing process. As the carrier, diatomaceous earth, pumice, activated carbon, silica gel, or alumina may be used. Besides, the catalyst conforming to this invention may be formed by melting and depositing the catalyst components on the carrier surface of a proper shape, and it is also possible to melt and deposit the catalyst components on the carrier surface inside a reaction apparatus, so that the reaction may effectively progress. Furthermore, if the activity of the catalyst conforming to the present invention is lowered in the course of use, it may be regenerated by causing it to react, after heat treatment, with alkali and water at a temperature of 220° to 450° C. in a carbon monoxide atmosphere, rinsing the reaction product, and reducing the product together with a phenol at a temperature of 400° to 450° C. in a hydrogen atmosphere.

The following examples serve to illustrate the present invention but should not be construed as imposing any limitations on the invention.

EXAMPLE 1

To 5 g of molybdenum carbonyl were added 15 g of sodium hydroxide and 10 ml of water, and the mixture was heated for an hour at 410° C. in a carbon monoxide atmosphere (initial pressure 100 kg/cm$^2$). The reaction product was thoroughly washed in warm water, and heated to dryness at 100° C. under reduced pressure. To 2.6 g of this dried black reaction product were added 1 g of catechol as phenol and 25 ml of tetralin as medium oil, and the mixture was allowed to react for an hour at 420° C. in a hydrogen atmosphere (hydrogen initial pressure 100 kg/cm$^2$). The reaction product was filtered, cleaned sufficiently in benzene, and dried at 120° C. for 24 hours under reduced pressure to give a catalyst (yield 2.51 g).

To 15 g each of heavy oil A, heavy oil B, and paving asphalt was added 30.0 mg of the above catalyst, and a hydrogenolysis reaction was conducted for an hour each at 440° C., 460° C., and 480° C. in a hydrogen atmosphere (hydrogen initial pressure 50 kg/cm$^2$). The reaction product was distilled at atmospheric pressure. The result is shown in Table 1. As a control, reactions without catalyst are also shown.

TABLE 1

| Type of oil | Temperature of hydrogenolysis | Catalyst | Yield by distilling temperature (wt. %) | | | |
|---|---|---|---|---|---|---|
| | | | Less than 75° C. | 75 to 175° C. | 175 to 220° C. | Over 220° C. |
| Heavy Oil A | 440° C. | Not used | 0.6 | 11.1 | 16.8 | 72.3 |
| | | Used | 13.2 | 31.7 | 36.4 | 18.7 |
| | 460° C. | Not used | 3.2 | 23.6 | 21.9 | 67.9 |
| | | Used | 20.6 | 55.3 | — | 24.1 |
| | 480° C. | Not used | 4.8 | 22.9 | 12.1 | 60.2 |
| | | Used | 38.9 | 47.2 | — | 13.9 |
| Heavy Oil B | 440° C. | Not used | 4.7 | 11.8 | 24.1 | 56.4 |
| | | Used | 10.7 | 37.6 | 24.1 | 27 |
| | 460° C. | Not used | 9.5 | 14.0 | 22.7 | 50.8 |
| | | Used | 21.1 | 40.2 | — | 38.7 |
| Paving asphalt | 440° C. | Not used | trace | trace | 36.6 | 63.4 |
| | | Used | 6.7 | 26.1 | 14.0 | 52.0 |
| | 460° C. | Not used | trace | 8.2 | 30.2 | 61.6 |
| | | Used | 9.5 | 19.1 | 24.8 | 46.6 |
| | 480° C. | Not used | 4.8 | 12.1 | 21.6 | 61.5 |

TABLE 1-continued

| Type of oil | Temperature of hydrogenolysis | Catalyst | Yield by distilling temperature (wt. %) | | | |
|---|---|---|---|---|---|---|
| | | | Less than 75° C. | 75 to 175° C. | 175 to 220° C. | Over 220° C. |
| | | Used | 23.6 | 12.0 | 21.7 | 42.7 |

In this table, the yield refers to the percentage by weight of the product. A trace means less than 0.01%.

As evident from Table 1, the yield at low distilling temperature is notably increased by using the catalyst conforming to the present invention as compared with the control without catalyst.

EXAMPLE 2

5 g of molybdenum oxide was mixed with 15 g of sodium hydroxide and 10 ml of water, and the mixture was heated for an hour at 410° C. in a carbon monoxide atmosphere (initial pressure 100 kg/cm$^2$). The reaction product was thoroughly washed in warm water, and heated to dryness at 100° C. under reduced pressure. To 2.6 g of thus dried reaction product were added 1 g of catechol as phenol and 25 ml of tetralin as medium oil, and the mixture was allowed to react for an hour at 420° C. in a hydrogen atmosphere (hydrogen initial pressure 100 kg/cm$^2$). The reaction product was filtered, cleaned sufficiently in benzene, and dried at 120° C. for 24 hours under reduced pressure to give a catalyst.

To 15 g each of heavy oil A, heavy oil B, and paving asphalt was added 30.0 mg of the above catalyst as in the case of the previous example, and a hydrogenolysis reaction was conducted for an hour each at 440° C., 460° C., and 480° C. in a hydrogen atmosphere (hydrogen initial pressure 50 kg/cm$^2$). The reaction product was distilled at atmospheric pressure. The obtained result was almost the same as the data in Table 1.

EXAMPLE 3

Five sheets of stainless steel measuring 3.2 cm in length, 1.5 cm in width and 2 mm in thickness were manufactured from SUS316 specified in the Japanese Industrial Standard containing molybdenum in an amount of 3 to 5 wt.%, to which were added 5 g of sodium hydroxide and 10 ml of water, and the mixture was heated for an hour at 410° C. in a carbon monoxide atmosphere (initial pressure 100 kg/cm$^2$). The reaction product was thoroughly washed in warm water, and heated to dryness at 100° C. under reduced pressure. To 2.6 g of thus dried reaction product were added 1 g of catechol as phenol and 25 ml of tetralin as medium oil, and the mixture was allowed to react for an hour at 420° C. in a hydrogen atmosphere (hydrogen initial pressure 100 kg/cm$^2$). The reaction product was filtered, cleaned sufficiently in benzene, and dried at 120° C. for 24 hours under reduced pressure to give a catalyst.

To 15 g each of heavy oil A, heavy oil B, and paving asphalt was added 30.0 mg of the above catalyst as in the case of the previous examples, and a hydrogenolysis reaction was conducted for an hour each at 440° C., 460° C., 480° C. in a hydrogen atmosphere (hydrogen initial pressure 50 kg/cm$^2$). The reaction product was distilled at atmospheric pressure. The result is shown in Table 2. As a control, reactions without catalyst are also shown.

TABLE 2

| Type of oil | Temperature of hydrogenolysis | Catalyst | Yield by distilling temperature (wt. %) | | | |
|---|---|---|---|---|---|---|
| | | | Less than 75° C. | 75 to 175° C. | 175 to 220° C. | Over 220° C. |
| Heavy Oil A | 440° C. | Not used | 0.6 | 11.1 | 15.1 | 73.2 |
| | | Used | 7.0 | 24.2 | 35.7 | 33.1 |
| | 460° C. | Not used | 3.2 | 15.9 | 14.1 | 67.9 |
| | | Used | 15.5 | 32.7 | 25.1 | 26.7 |
| | 480° C. | Not used | 4.8 | 22.9 | 12.1 | 60.2 |
| | | Used | 26.8 | 49.6 | 8.6 | 15.6 |
| Heavy Oil B | 440° C. | Not used | 0.8 | 12.2 | 24.9 | 62.1 |
| | | Used | 10.2 | 29.6 | 10.3 | 49.9 |
| | 460° C. | Not used | 3.8 | 14.5 | 23.4 | 52.4 |
| | | Used | 16.4 | 21.3 | 25.0 | 37.2 |
| | 480° C. | Not used | 7.8 | 22.3 | 16.6 | 43.3 |
| | | Used | 25.6 | 41.5 | 7.5 | 25.4 |
| Paving asphalt | 440° C. | Not used | 0 | 0 | 36.6 | 63.4 |
| | | Used | 3.0 | 10.2 | 27.5 | 59.3 |
| | 460° C. | Not used | 0 | 8.2 | 30.2 | 61.6 |
| | | Used | 7.4 | 28.0 | 16.0 | 47.6 |
| | 480° C. | Not used | 0 | 12.1 | 21.6 | 61.5 |
| | | Used | 12.3 | 35.0 | — | 53.7 |

The yield refers to the percentage by weight of the product.

EXAMPLE 4

Five bars measuring 0.8 cm in diameter and 2 cm in length were manufactured by SKH9 specified in the Japanese Industrial Standard containing molybdenum in an amount of 5 to 6 wt.%, to which were added 5 g of sodium hydroxide and 10 ml of water, and the mixture was heated for an hour at 410° C. in a carbon monoxide atmosphere (initial pressure 100 kg/cm$^2$). The reaction product was thoroughly washed in warm water, and heated to dryness at 100° C. under reduced pressure. To 2.6 g of thus dried reaction product were added 1 g of catechol as phenol and 25 ml of tetralin as medium oil, and the mixture was allowed to react for an hour at 420° C. in a hydrogen atmosphere (hydrogen initial pressure 100 kg/cm$^2$). The reaction product was filtered, washed sufficiently with benzene, and dried at 120° C. for 24 hours under reduced pressure to give a catalyst.

To 15 g each of heavy oil A, heavy oil B, and paving asphalt was added 30.0 mg of the above catalyst as in the case of the previous examples, and a hydrogenolysis reaction was conducted for an hour each at 440° C., 460° C., and 480° C. in a hydrogen atmosphere (hydrogen initial pressure 50 kg/cm$^2$). The reaction product was distilled at atmospheric pressure. The obtained result was almost same as the data in Table 2.

In the above examples, catechol was used as phenol, but monovalent phenols or other polyvalent phenols may also be used in other examples of the present invention.

Similarly, in the above examples, tetralin was used as medium oil, but diphenylmethane or other medium oil may be used in the present invention.

The catalyst conforming to this invention is applicable not only to liquefaction of coal and hydrogenolysis of heavy petroleum oils or paving asphalt, but also to hydrodesulfurization. For example, it is possible to remove the sulfur content by about 60% from heavy oil A, heavy oil B, and paving asphalt containing sulfur in an amount of 1.9 wt.%, 2.5 wt.%, and 4.8 wt.%, respectively, in the form of hydrogen sulfide.

The present inventors studied to clarify the structure of the catalyst conforming to this invention. Table 3 shows the results of chemical analysis of a catalyst, from which the experimental formula was estimated as $Mo_5O_{15}Na_2H_5$.

TABLE 3

| Element | Percentage by weight (%) |
|---------|--------------------------|
| Mo | 64.57 |
| Na | 5.58 |
| H | 0.06 |
| O | 29.79 |

Figure 2:
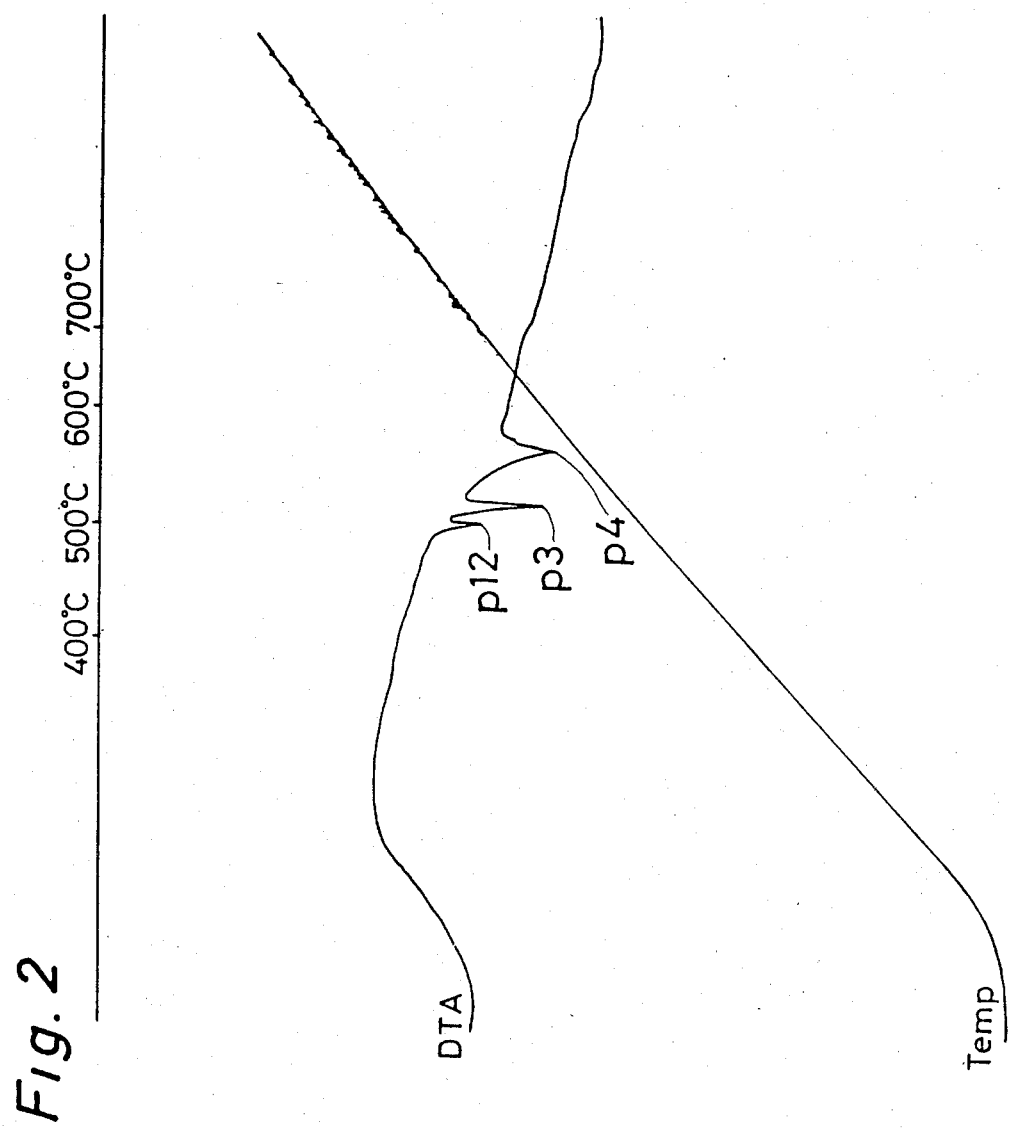

FIG. 1 is a chart of differential thermal analysis of the catalyst. The DTA curve 1 has heat absorption peaks of P1 and P2 at 515° C. and 585° C. This two-peak profile suggests either that the catalyst has two different crystalline structures, or that it is made of two compounds. FIG. 2 is a chart of differential thermal analysis obtained when the catalyst conforming to the present invention was regenerated by heat treatment. Similarly, the curve has heat absorption peaks of P3 and P4 at 510° C. and 580° C. respectively. Furthermore, the curve has one more absorption peak of P12 at 495° C. The peaks P3 and P4 at 510° C. and 580° C. show that the catalyst characteristic is not changed by heat treatment. A similar chart was obtained after the heat treatment was repeated three or four times.

Figure 3:
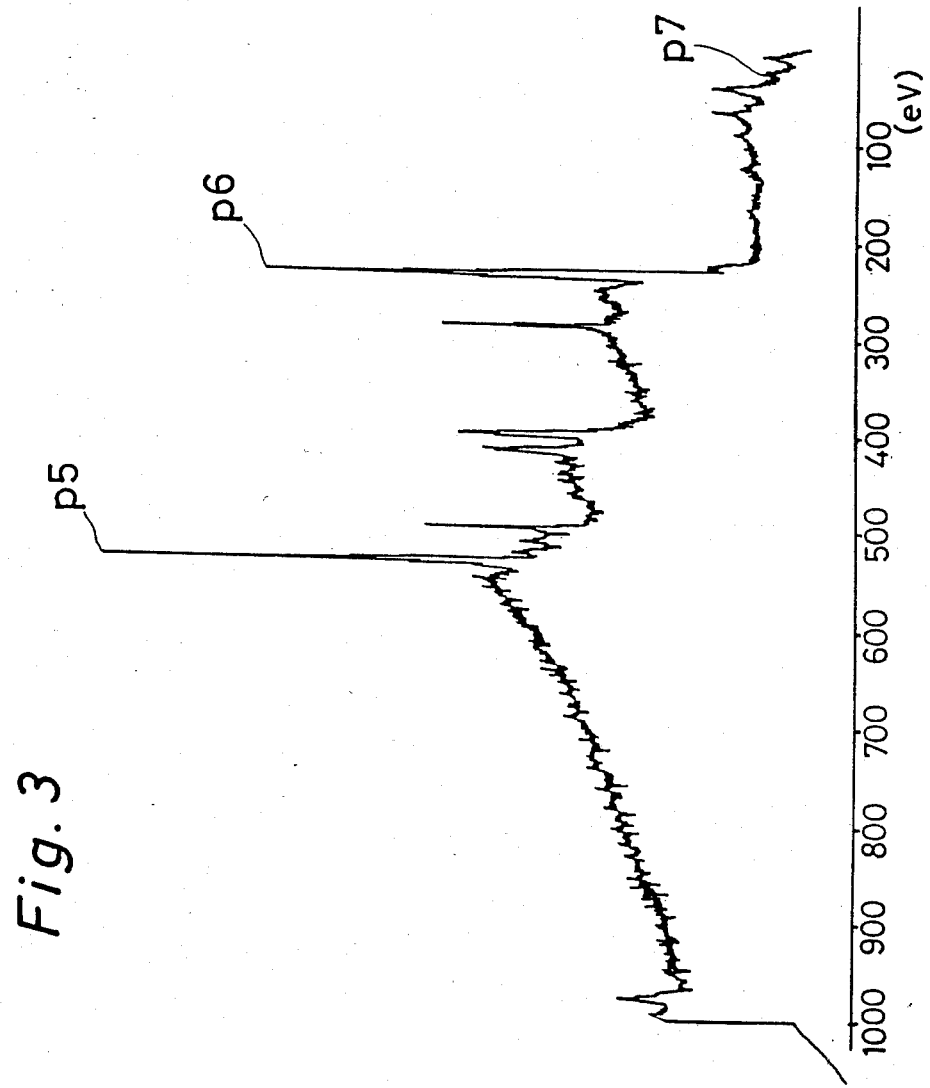
FIGS. 3 and 4 are electron spectra by ESCA.
Figure 4:
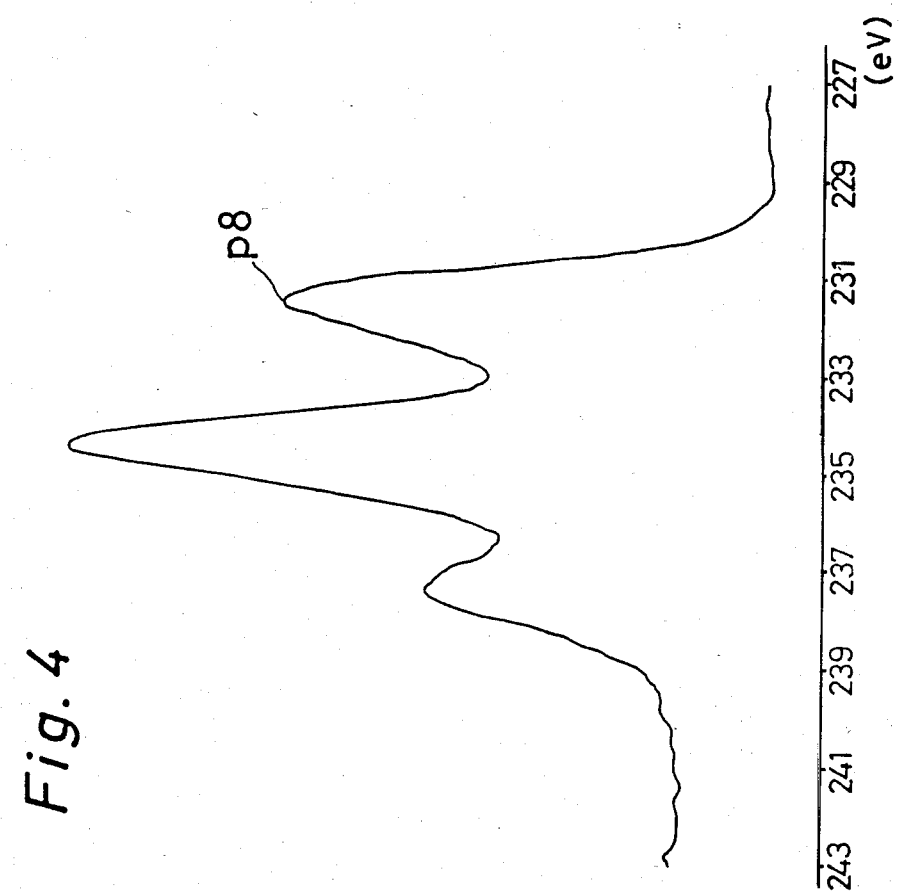

FIGS. 3 and 4 are electron spectra of the catalyst by ESCA (electron spectroscopy for chemical analysis). The electron spectrum in FIG. 3 revealed absorption peaks P5, P6, and P7 of electron on orbit 1s of oxygen, electron on orbit 3d of molybdenum, and electron of sodium, respectively. That is, a constituent elements of the catalyst, oxygen, molybdenum and sodium were identified. Accordingly, since oxides of molybdenum were expected, an ESCA was measured in a coupling energy range 227 eV to 243 eV of oxides of molybdenum. As a result, as shown in FIG. 4, an absorption peak P8 was noted at 229.3 eV. Meanwhile, the spectrum in FIG. 4 is shifted to the higher energy side by 2.3 eV. On the other hand, according to available literature, the coupling energy of metallic molybdenum is 226.1 eV, and that of $Mo(CO)_6$ and $MoO_2$ is 226.6 eV and 230.9 eV, respectively. Therefore, the valency of catalyst's molybdenum was estimated to be neither 4 nor 6. The valency of the above experimental formula $Mo_5O_{15}Na_2H_5$ is $(23/5)=4.6$, which agrees with the estimation by ESCA.

Figure 5:
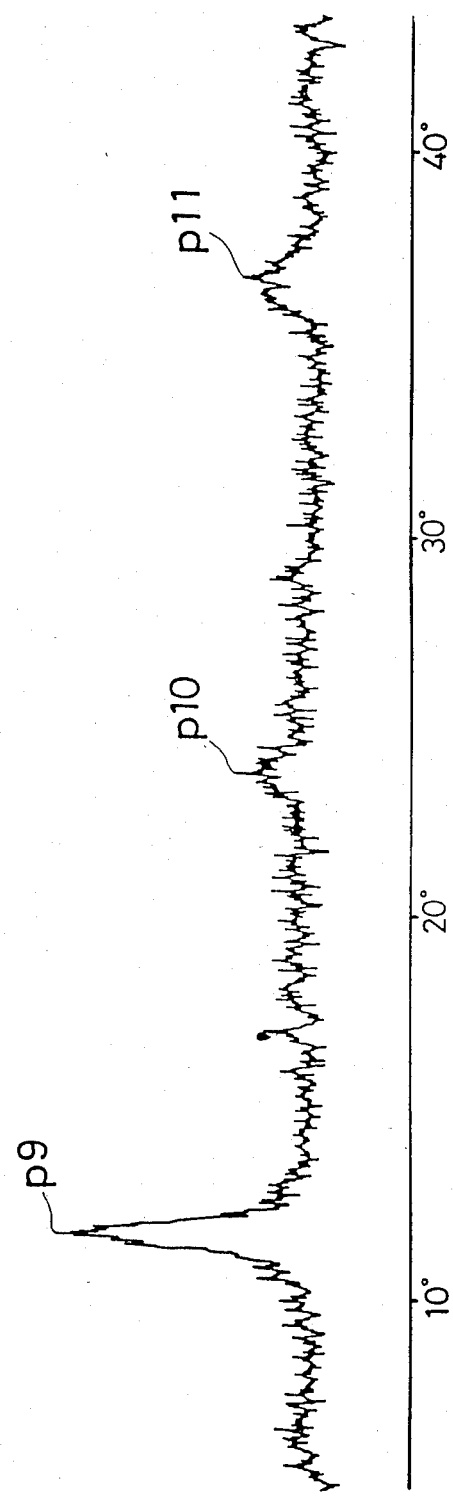
FIG. 5 is an X-ray diffraction chart.

FIG. 5 is an X-ray diffraction chart of the catalyst. Absorption peaks P9, P10, and P11 were detected at rotational angles of 12.8°, 23.8°, and 37.78°. The grating planes were 7.49 Å, 3.70 Å, and 2.44 Å, and supposing the strength of 7.49 Å as 100, the strength of 3.70 Å and 2.44 Å would be 33.7 and 33.7, respectively. Nothing corresponding to this finding is listed in ASTM, and it is known that this catalyst is a novel substance. The most similar matter is ASTM9-159, $Mo_5O_8(OH)_6$, of which grating planes are 7.33 Å, 3.68 Å, and 1.89 Å, and strengths are 90, 100, and 90, respectively. In sum, these two materials are considerably different from each other. In any case, since three gratings were observed in the X-ray diffraction, this catalyst was confirmed to possess a crystalline structure.

Figure 6:
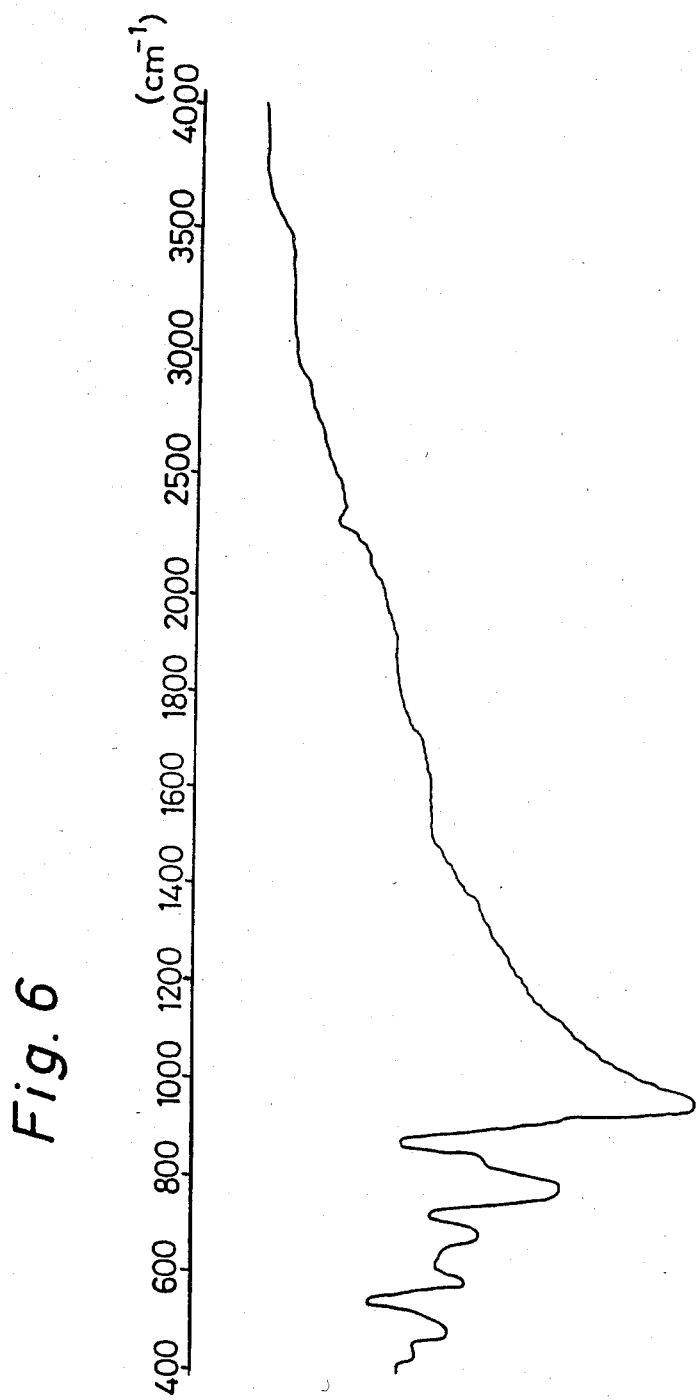
FIGS. 6 and 7 are infrared ray absorption spectra.

FIG. 6 is an infrared ray absorption spectrum of the catalyst. A characteristic absorption is shown at less than 900 cm$^{-1}$, which is estimated to be due to Mo-O or Na-O.

Figure 7:
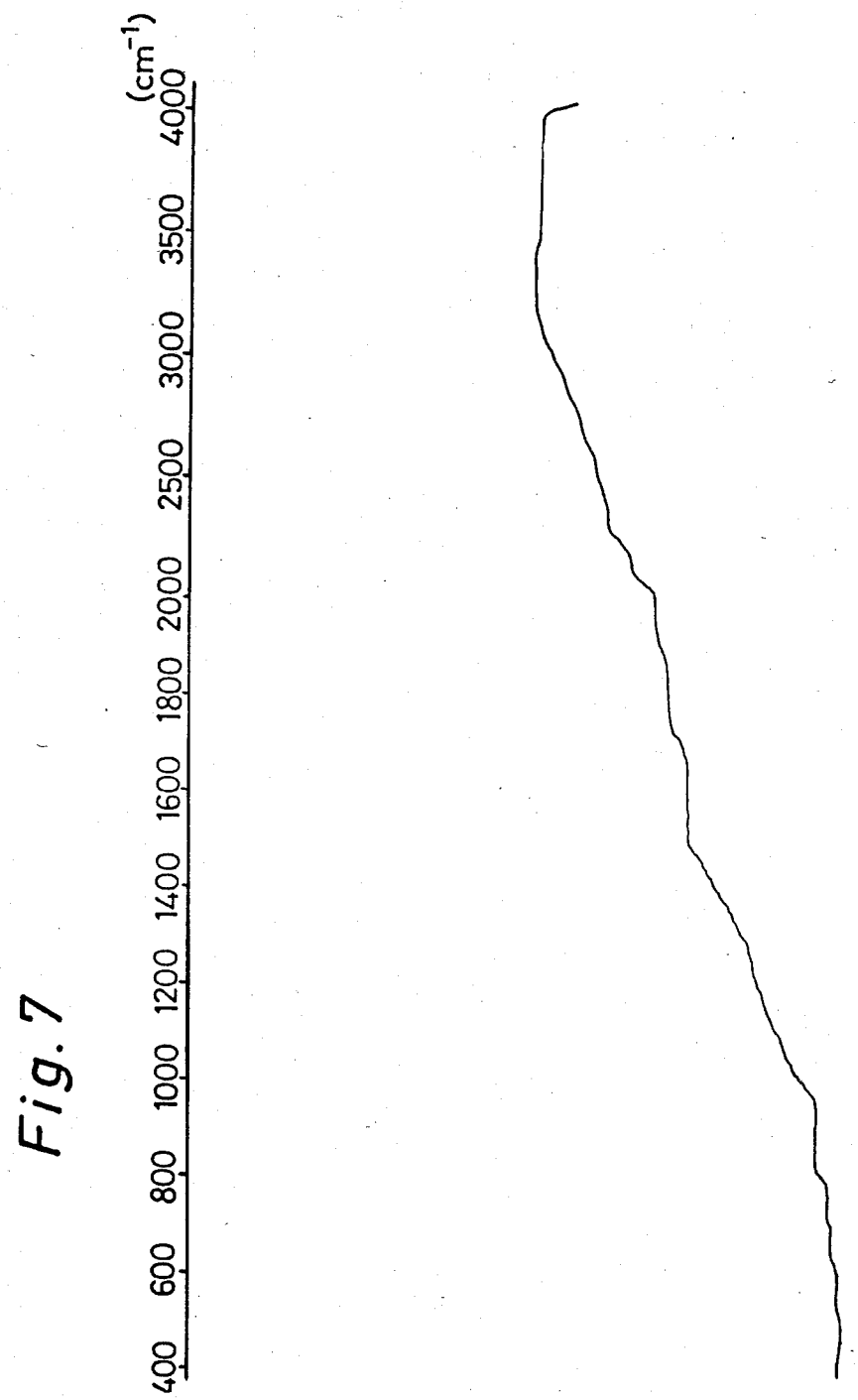

FIG. 7 is an infrared ray absorption spectrum of a product obtained by causing one or more compounds selected from the group consisting of carbonyl compound of molybdenum, salts of molybdenum, oxides of molybdenum, metallic molybdenum and alloys containing molybdenum to react with alkali and water at a temperature of 220° to 450° C. in a carbon monoxide atmosphere. Absorption is not noted at less than 900 cm$^{-1}$. This result suggests that reduction in the presence of a phenol at a temperature of 400° to 450° C. in a hydrogen atmosphere is an indispensable process for manufacturing the catalyst conforming to the present invention.

The present inventors, accordingly, estimated the compositional formula of the catalyst to be $Mo_5O_{15}Na_2H_5$, but could not accurately determine the constitutional formula. Supposing the compositional formula to be $Mo_5O_{15}Na_2H_5$, the chemical composition is Mo 62.25%, O 31.12%, Na 5.96%, and H 0.64%, which agrees fairly well with the analytical result in Table 3.

What is claimed is:

1. A method for hydrogenolysis of heavy petroleum oils, which comprises contacting said oils with a catalyst in a hydrogen atmosphere having a hydrogen initial pressure of 50 kg/cm$^2$ at a temperature sufficient to effect said hydrogenolysis, said catalyst being prepared by a process which comprises:

reacting at least one member selected from the group consisting of carbonyl compounds of molybdenum, salts of molybdenum, oxides of molybdenum, metallic molybdenum and alloys containing molybdenum, with an alkali and water at a temperature from 220° to 450° C. under a carbon monoxide atmosphere, reducing the resultant reaction product in the presence of a phenol at a temperature from 400° to 450° C. under a hydrogen atmosphere, and recovering said reduced reaction product.

2. A method according to claim 1, wherein the carbonyl compound of molybdenum is molybdenum carbonyl.

3. A method according to claim 1, wherein the salt of molybdenum is an ammonium salt, nitrate, chloride, carbonate or organic acid salt of molybdenum.

4. A method according to claim 1, wherein the oxide of molybdenum is molybdenum trioxide.

5. A method according to claim 1, wherein the alloy containing molybdenum contains at least 0.3 weight percent of molybdenum.

6. A method according to claim 1, wherein the alkali is a carbonate or phosphate of an alkali metal, a hydroxide of an alkali metal of alkaline earth metal, or ammonium hydroxide.

7. A method according to claim 1, wherein the hydrogenolysis is conducted at a temperature of 440°–480° C.

8. A method according to claim 1, wherein the carbon monoxide atmosphere has an initial pressure of 100 kg/cm$^2$.

9. A method according to claim 1, wherein the hydrogen atmosphere used in preparing the catalyst has a hydrogen initial pressure of 100 kg/cm$^2$.

* * * * *